No. 789,572. PATENTED MAY 9, 1905.
C. A. STAUFFER.
CONTROLLER FOR ELECTRIC MOTORS.
APPLICATION FILED SEPT. 1, 1904.
3 SHEETS—SHEET 1.
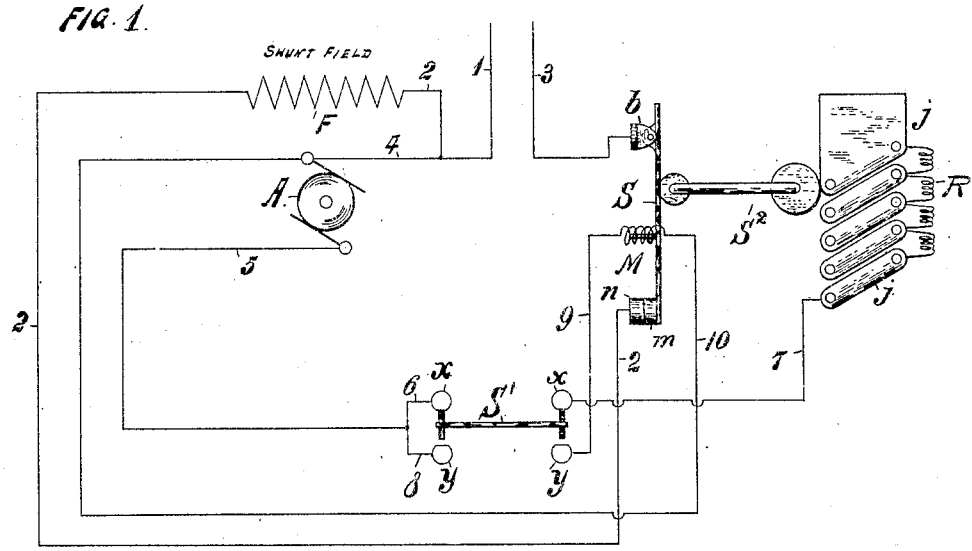
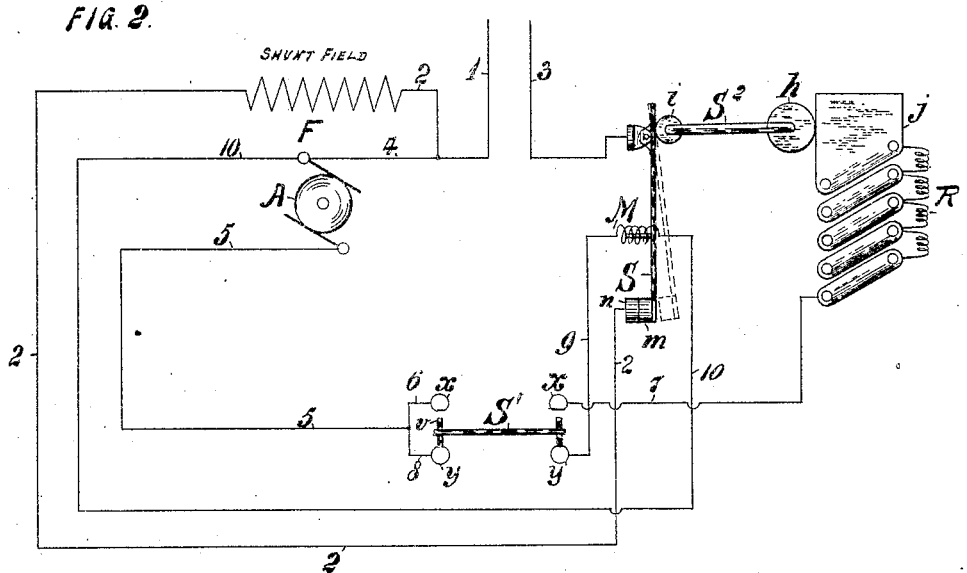
WITNESSES:
INVENTOR
Charles A. Stauffer,
BY Henry J. Miller,
his ATTORNEY.

No. 789,572. PATENTED MAY 9, 1905.
C. A. STAUFFER.
CONTROLLER FOR ELECTRIC MOTORS.
APPLICATION FILED SEPT. 1, 1904.

3 SHEETS—SHEET 2.

WITNESSES:

INVENTOR
Charles A. Stauffer,
BY Henry J. Miller
his ATTORNEY.

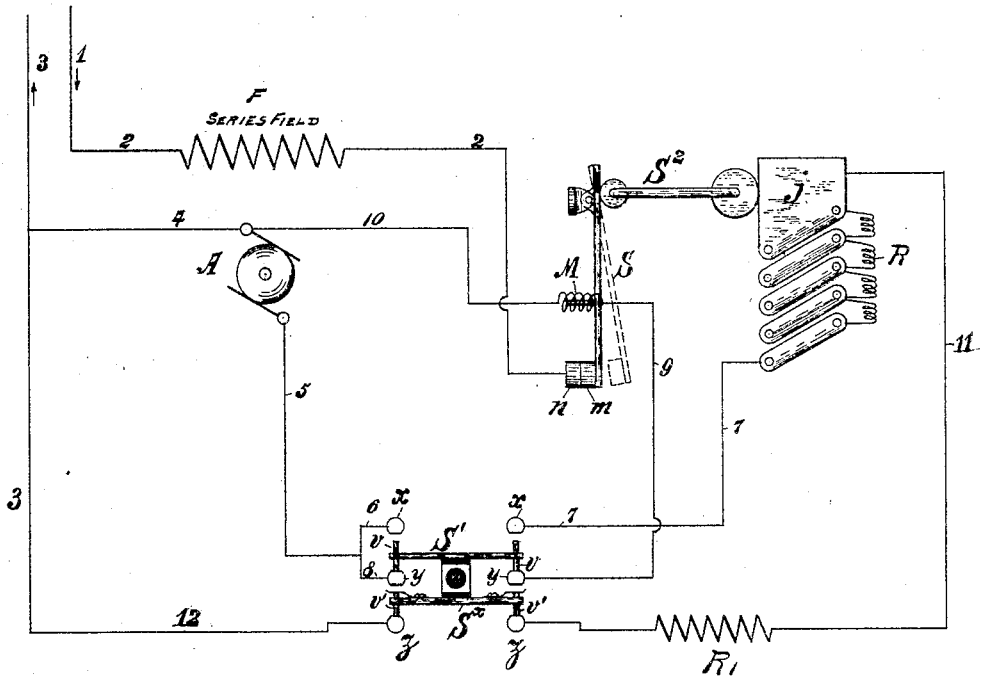

No. 789,572. Patented May 9, 1905.

UNITED STATES PATENT OFFICE.

CHARLES A. STAUFFER, OF ELIZABETH, NEW JERSEY, ASSIGNOR TO DIEHL MANUFACTURING COMPANY, A CORPORATION OF NEW JERSEY.

CONTROLLER FOR ELECTRIC MOTORS.

SPECIFICATION forming part of Letters Patent No. 789,572, dated May 9, 1905.

Application filed September 1, 1904. Serial No. 222,914.

*To all whom it may concern:*

Be it known that I, CHARLES A. STAUFFER, a citizen of the United States, residing at Elizabeth, in the county of Union and State of New Jersey, have invented certain new and useful Improvements in Controllers for Electric Motors, of which the following is a specification, reference being had therein to the accompanying drawings.

This invention relates to an improvement in means for controlling the operation of electric motors in which the armature is adapted to be disconnected from the main circuit and short-circuited, so that while the field remains excited the armature, continuing to rotate under its own momentum, generates a current which under the influence of the short circuit imposes an excessive load upon the armature, and thus serves as a brake to arrest the rotation of the latter.

The invention has for its object to provide a controlling device for the several motor-circuits of such nature that a single initial actuation of the same will cause first a short circuit of the armature and thereafter the opening of the final connection of the motor with the main circuit substantially as the movable member of the motor comes to rest.

The invention consists, essentially, in a motor having its field-coils connected with the main circuit and an armature having its terminals connected both with the main circuit and the short circuit and a compound switch having successively-acting members for first exchanging the main for the short circuit connection of the armature and subsequently interrupting the main-circuit connection with the field-coils.

The invention further includes specific means under the influence of the current generated in the armature short circuit for preventing the final cut-out of the motor from the main circuit until the motor has practically come to rest.

The invention will be understood by reference to the drawings annexed, in which—

Figure 5:
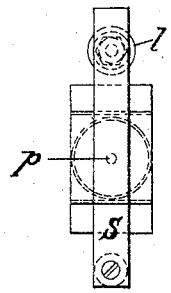
Figure 3:
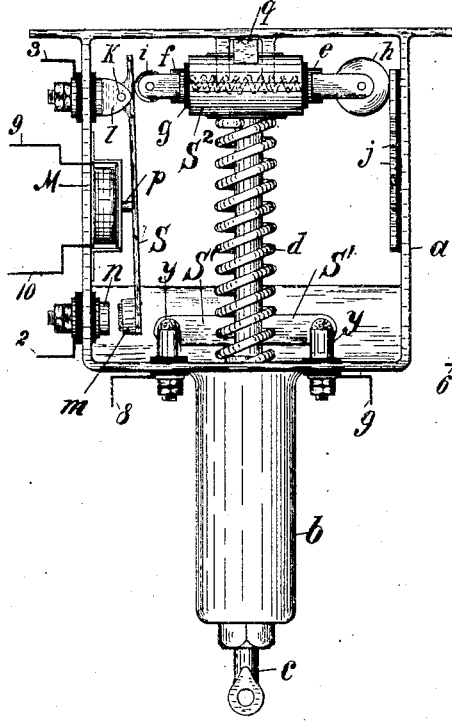
Figure 4:
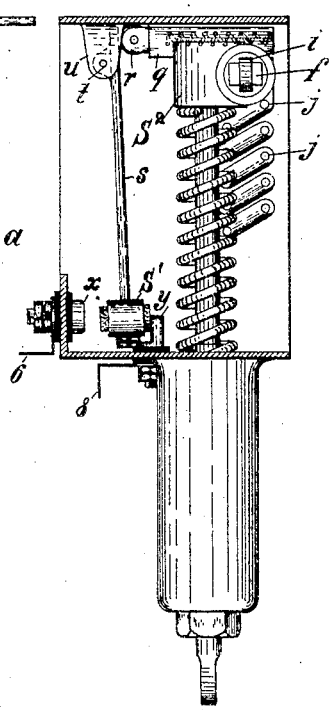
Figure 6:
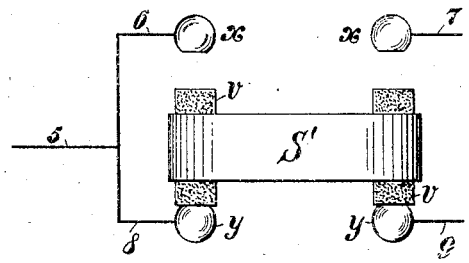

Figures 1 and 2 are diagrams representing the several circuits of a shunt-motor with their electrical connections indicated, respectively, in running and stopping relations. Fig. 3 is a front view of the switch-box with the cover-plate removed to expose the parts within, and Fig. 4 an end view of the same with the box or casing partially in section. Fig. 5 is an elevation of one of the switch members and the magnet for controlling the same while the motor is coming to rest, and Fig. 6 is an end view of another of the contact members with the points which it serves to connect. Fig. 7 is a diagram similar to Fig. 2, showing the present improvement in connection with a series motor.

The motor is or may be of any well-known or suitable type in which both armature and field coils have normally direct connection with the main circuit, while the armature has an independent normally open circuit, and, as represented in Figs. 1 and 2, comprises the armature A and shunt-field F, whose several circuits are controlled by a compound switch comprising the movable members S, S', and S².

As indicated in Fig. 1, the field F is connected with one terminal, 1, of the main circuit through a wire 2, leading to one contact-point of the switch-lever S, having a permanent connection with the other terminal, 3, of the main circuit, whereby the field is maintained excited while the lever S' is in initial position. One of the brushes of the armature is connected with the same leading-in terminal 1 of the main circuit by means of the wire 4, while the other brush is connected with a wire 5, having a branch 6 to one contact-point of the switch S', of which another point normally connected therewith is connected by a wire 7, through the series of resistances R and the switch member S², with the switch member S, having a connection with the terminal 3 of the main circuit, as before described. The wire 5, leading through the second brush of the armature, has another branch, 8, to its respective contact-point of the switch S', which is adapted to be temporarily connected, as indicated in Fig. 2, with still another point, connected by the wire 9 with a magnet M and thence through the wire 10 back to the first-named brush.

As represented in Fig. 1, the field-circuit 2 and the armature-circuit 4 5 6 7 are closed to cause the motor to run at a slow speed, the several resistances R being interposed in such primary armature-circuit, while, as represented in Fig. 2, the switch S' is thrown so as to open the primary armature-circuit and close the short circuit of the armature, causing the generation therein by its continued rotation of a reverse current, which under the influence of the short circuit imposes a braking force on the rotation of the armature, while such current simultaneously excites the magnet M to retain the switch member S in operative position against the contrary yielding action of the member $S^2$, to be hereinafter described. The armature having come to rest by the braking action of the current developed therein under the conditions just described, current ceases to flow in the armature short circuit 5 8 9 10, the magnet M thus losing its power and permitting the member S to assume its inoperative position (shown in dotted lines in Fig. 2) to wholly interrupt the connection of the field-coils with the main-circuit terminal 3.

Having thus set forth the operations to be performed by the controller, I will now describe the latter.

The switch-box comprises a rectangular casing $a$, with depending cylindrical socket $b$, housing the lower end of the operating-rod $c$, encircling which is the spring $d$, interposed between the lower end of the socket $b$ and the head $S^2$ of the operating-rod. The head $S^2$ carries two spring-pressed contact-plugs $e$ and $f$, insulated therefrom by the bushing $g$ and each forked at its outer end to receive a contact-roller $h$ and $i$, respectively. The contact-roller $h$ rolls upon the several relatively insulated plates $j$ of the series of resistances R in a manner well known, while the roller $i$ rests in permanent contact with the switch-lever S, pivoted at its upper end slightly below the initial position of the plug $f$ at $k$ upon the insulated forked lug $l$ and carrying at its lower end a stud $m$, adapted to establish connection with the insulated contact-point $n$. A fixed solenoid-magnet M, acting upon the core $p$, carried by the lever S, serves to control the position of the latter in opposition to the spring-pressed plug $f$.

The head $S^2$ of the operating-rod $c$ carries a spring-pressed plug $q$, forked at its outer end to embrace the contact-roller $r$, which is maintained in permanent contact with the pivoted lever $s$, mounted upon the pivotal pin $t$ in the fixed bracket $u$ and having at its opposite end the head S', shown herein provided with suitable carbon contacts, and thus adapted to connect together the members of either of the two pairs of insulated contact-studs $x$ and $y$, respectively.

In the initial position of the operating-rod, (represented in Figs. 3 and 4,) in which the member $S^2$ is in its extreme elevated position, the principal switch-lever S is in the retracted position assumed under the action of the spring-pressed roller $i$ upon its tail above the pivotal pin $k$, the armature short circuit is closed by the similar swinging action of the lever $s$ S' under the action of the spring-pressed roller $r$ upon its tail portion above the pivotal pin $t$, and the upper resistance contact-plate $j$ is in connection with the main terminal 3, the main circuit of the armature being interrupted by the switch member S, as indicated partially in dotted lines in Fig. 2, and the motor remains at rest. As the operating-rod $c$ is drawn downward in opposition to its spring $d$ and the spring-pressed contact-rollers $i$ and $r$ simultaneously pass below the pivotal points of the levers S and $s$ its operation is to close the main motor-circuit by connecting the wires 2 and 3 through the lever S and to throw the armature into the main circuit by connection of the wires 6 and 7 through the switch member S', which establishes normal conditions in the motor for causing the latter to rotate. As the operating-rod $c$ is further drawn downward the member $S^2$ operates to gradually cut out the resistances from the primary armature-circuit in a manner well known, so as to increase the speed of the motor to the maximum.

The release of the operating-rod $c$ enables its spring $d$ to raise the member $S^2$ for successively throwing in the resistances R, shifting the member S' to short-circuit the motor and cause the contact-roller $i$ to exert a pressure upon the upper portion of the lever S above its point of support, which is resisted, however, by the action of the magnet M under the influence of the current in the armature short circuit. As the armature comes to rest under the influence of the braking effect imposed by the short circuit the flow of current through the magnet M ceases and the primary switch-lever S is thrown into the inoperative position (shown in Fig. 3) under the action of the roller $i$.

By reference to Fig. 7 it will be observed that for operating a series motor in the manner before described the controlling device is substantially the same, merely requiring in addition thereto a third pair of contact-points $z$ and a second cross-bar $S^\times$, connected with the member S', but insulated therefrom, and carrying two yielding contact-pieces $v'$ to insure the closing of the circuit through the points $z$ simultaneously with that through the points $y$. As indicated in the figure referred to, current normally flows from the leading-in wire 1 of the main circuit through the wire 2, field F, and switch members S S² to the primary contact-plate $j$, thence through the resistance R, wire 7, switch member S', and wires 6 and 5 to the armature A, whence it flows through the wire 4 to the other main-circuit terminal 3. When the switch member S' is thrown as indicated in Fig. 7, the course of the main current is from the terminal 1 through the wire 2, field F, switch members S S² to the primary resistance contact-plate $j$, and thence through the branch-circuit wire 11, resistance R', contact-points $z\ z$, connected by the switch member S×, and wire 12 to the other main-circuit terminal 3, while the independent circuit through the armature passes from one brush through the wires 5 and 8, the contact-points $y\ y$, connected by the switch member S', wire 9, magnet M, controlling the switch member S, and wire 10 to the other brush. As in the embodiment of the present improvement previously described, the braking of the armature by short-circuiting it as described causes its arrest soon after the throw of the switch member S' S× and the consequent cessation of flow of current through the electromagnet M and consequent release of the member S, which is thus enabled to assume its open position (indicated in dotted lines) under the action of the member S², as previously described.

It is evident that the present improvement is susceptible of considerable modification without departure from the spirit of the invention, the electromagnetic action of the current in the independent armature-circuit being readily replaced by mechanical means for effecting the retardation of the throw of the primary switch-lever S under the action of the spring-pressed plug $f$ with its roller $i$, while the type and construction of motor employed and the various features of construction and arrangement of its controlling mechanism as shown and described herein may be modified to a considerable extent.

Having thus set forth the nature of my invention, what I claim herein is—

1. The combination with an electric motor comprising an armature and a field adapted to be normally connected with the main circuit to set the motor in operation, of a device constructed and arranged to effect, by a single actuation, the short-circuiting of the armature and the opening of the field connection with the main circuit, and controlling means, inoperative when the motor is at rest, for preventing the opening of the said field connection with the main circuit in opposition to the said device.

2. The combination with an electric motor comprising an armature and a field adapted to be normally connected with the main circuit to set the motor in operation, and an independent normally open armature-circuit, of a compound switch constructed and arranged to operate by a single initial actuation to open the connection of the armature with the main circuit and close the independent armature-circuit and to simultaneously establish conditions for the opening of the main circuit with the motor, and means for preventing the opening of the main circuit until the operation of the motor has substantially ceased.

3. The combination with an electric motor comprising an armature and a field adapted to be normally connected with the main circuit to set the motor in operation, and an independent normally open armature-circuit containing an electromagnet, of a compound switch comprising a plurality of independent members one of which is influenced by said magnet to maintain the main circuit closed, and means for controlling the switch members whereby a single actuation causes one of said members to open the connection of the armature with the main circuit and close the independent armature-circuit and to simultaneously produce in the main-circuit switch member a tendency to open in opposition to the said electromagnet.

4. The combination with an electric motor comprising an armature and a field adapted to be normally connected with the main circuit to set the motor in operation, of means constructed and arranged to effect successively the short-circuiting of the armature and the opening of the field connection with the main circuit, and automatically-acting means controlled independently thereof for delaying the opening of the field connection.

5. The combination with an electric motor comprising an armature and a field adapted to be normally connected with the main circuit to set the motor in operation, of independent switch members adapted for short-circuiting the armature and opening the field connection with the main circuit, a device acting successively upon said switch members for yieldingly actuating the same successively, and controlling means acting independently of and in opposition to said device for delaying the opening of the field connection.

6. The combination with an electric motor comprising an armature and a field adapted to be normally connected with the main circuit to set the motor in operation, of means constructed and arranged to effect the short-circuiting of the armature and to open the field-circuit, and means controlled by current generated in the short-circuited armature-circuit for maintaining the field connection with the main circuit closed until the generation of current in the short-circuited armature-circuit substantially ceases.

7. The combination with an electric motor having a shunt-circuit on its field-magnet, of a switching apparatus whereby the armature may be thrown onto a short circuit for the purpose of converting the motor into a generator to consume its momentum and an automatic switch adapted to open said shunt-circuit when the armature comes to a stop.

In testimony whereof I have signed my name to this specification in the presence of two subscribing witnesses.

CHARLES A. STAUFFER.

Witnesses:
GUSTAVE C. MARX,
HENRY J. MILLER.